United States Patent
Sugahara

(10) Patent No.: US 9,755,508 B2
(45) Date of Patent: Sep. 5, 2017

(54) STARTUP CIRCUIT AND POWER SUPPLY CIRCUIT

(71) Applicant: FUJI ELECTRIC CO., LTD., Kawasaki-shi (JP)

(72) Inventor: Satoshi Sugahara, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 113 days.

(21) Appl. No.: 14/583,082

(22) Filed: Dec. 24, 2014

(65) Prior Publication Data

US 2015/0244265 A1 Aug. 27, 2015

(30) Foreign Application Priority Data

Feb. 26, 2014 (JP) ................................. 2014-035064

(51) Int. Cl.
*G05F 1/00* (2006.01)
*H02M 3/156* (2006.01)
*H02M 1/36* (2007.01)

(52) U.S. Cl.
CPC ............. *H02M 3/156* (2013.01); *H02M 1/36* (2013.01)

(58) Field of Classification Search
CPC .... H02M 3/156; H02M 3/1588; H02M 3/157; H02M 1/36; B23K 11/248
USPC ................ 323/222, 238, 271, 282–285, 288; 363/49
See application file for complete search history.

(56) References Cited

U.S. PATENT DOCUMENTS

| 7,362,595 | B2 * | 4/2008 | Noma | H02M 3/1588 323/224 |
| 7,782,024 | B2 * | 8/2010 | Fukushi | H02M 1/088 323/222 |
| 2007/0296386 | A1 | 12/2007 | Umeki | |
| 2011/0006746 | A1 * | 1/2011 | Lu | H02M 1/36 323/288 |
| 2013/0335052 | A1 * | 12/2013 | Li | G05F 1/618 323/285 |

FOREIGN PATENT DOCUMENTS

| JP | 2004-023948 A | 1/2004 |
| JP | 2004-215356 A | 7/2004 |
| JP | 2007-336628 A | 12/2007 |

* cited by examiner

*Primary Examiner* — Nguyen Tran
(74) *Attorney, Agent, or Firm* — Rabin & Berdo, P.C.

(57) ABSTRACT

In a startup circuit, an error amplifier receives a target voltage in a startup period that is a terminal voltage with a shape of a slope generated by charging a capacitor for soft starting with a current from a constant current circuit. A detecting circuit monitors variation of the terminal voltage and blocks pulse from a logic circuit until the terminal voltage, which has been zero volts at the moment of startup, reaches a predetermined threshold value. In this period, the detecting circuit disables the function of the error amplifier. It is not until the terminal voltage VCS reaches the predetermined threshold value and the PWM pulse begins to be delivered that the error amplifier is enabled. At this moment, startup control begins based on the difference between the terminal voltage and the feedback signal. Therefore, the output voltage never rises abruptly.

5 Claims, 9 Drawing Sheets

STARTUP CIRCUIT AND POWER SUPPLY CIRCUIT

CROSS-REFERENCE TO RELATED APPLICATION

This application is based on, and claims priority to, Japanese Patent Application No. 2014-035064, filed on Feb. 26, 2014, contents of which are incorporated herein by reference.

BACKGROUND OF THE INVENTION

1. Field of the Invention

The present invention relates to a startup circuit and power supply circuit, in particular to a startup circuit that raises output voltage slowly in the startup period of a power supply, avoiding fast variation of the output voltage, and to a power supply circuit including such a startup circuit.

2. Description of the Related Art

In a startup period of a power supply circuit, rising up of the output voltage can generate an inrush current. The power supply circuit in that case may fall into an overcurrent state and causes undesirable functioning of unstable startup of the power supply. Accordingly, power supply circuits are generally provided with a startup circuit with a soft starting function that reduces voltage rising up rate and prevents inrush current for achieving stable startup.

FIG. 10 is a block diagram showing an example of conventional DC to DC converter provided with a soft starting function. FIG. 11 shows waveforms of voltages in operation of the conventional DC to DC converter of FIG. 10.

The DC to DC converter comprises two semiconductor switches MH and ML series-connected between a power supply voltage VIN and the ground potential. In this example, N channel MOSFETs are used for the high side and low side semiconductor switches MH and ML. The connection point between the high side semiconductor switch MH and the low side semiconductor switch ML is connected through a series circuit of an inductor L and a smoothing capacitor CO to the ground potential. The connection point between the inductor L and the smoothing capacitor CO is connected to the output terminal of the DC to DC converter, from which an output voltage VOUT is delivered.

Between the output terminal of the DC to DC converter and the ground potential, series-connected resistors R1 and R2 are connected. The connection point between the resistors R1 and R2 is connected to an inverting input terminal of an error amplifier EA to supply a feedback signal VFB proportional to the output voltage VOUT to the error amplifier EA.

The error amplifier EA also receives an output VCS of a soft start circuit and a reference voltage VR at non-inverting terminals of the error amplifier EA, and amplifies the difference between (a) a smaller value of the output voltage VCS of the soft start circuit and the reference voltage VR and (b) the feedback signal VFB, and delivers the amplified difference from the output terminal of the error amplifier EA. The reference voltage VR is a target voltage for delivering a desired output voltage VOUT of the DC to DC converter.

The soft start circuit comprises a series circuit of a constant current circuit IS, which is a current source, and a capacitor CS for soft starting. The soft start circuit also comprises a discharging switch SW connected in parallel to the capacitor CS. When the discharging switch SW is closed, which is in an ON state of the switch, the terminal voltage of the capacitor CS becomes zero volts, which is applied to a non-inverting terminal of the error amplifier EA. When the discharging switch SW is opened, which is an OFF state of the switch, the capacitor CS is charged with a constant current from the constant current circuit IS. The terminal voltage VCS of the capacitor CS is a ramp voltage increasing on a slope, and is applied to the non-inverting terminal of the error amplifier EA The output terminal of the error amplifier EA is connected to a non-inverting terminal of a pulse width modulation (PWM) comparator COMP, delivering an error voltage VE. To an inverting terminal of the PWM comparator COMP, connected is an output terminal of an oscillator OSC that delivers a triangular signal VOSC.

An output terminal of the PWM comparator COMP is connected to an input terminal of a logic circuit LC and delivers a PWM pulse VPWM1 to the logic circuit LC. The output terminal of the logic circuit LC is connected to input terminals of a high side driver DH and a low side driver DL, and delivers PWM pulses VPWM2 which are logically reversed with each other. The output terminal of the driver DH is connected to a gate terminal of the semiconductor switch MH, and the output terminal of the driver DL is connected to a gate terminal of the semiconductor switch ML.

The logic circuit LC transforms the PWM pulse VPWM1 given by the PWM comparator COMP and delivers the PWM pulses VPWM2 to the driver DH and the driver DL. The logic circuit LC has functions, for example, to make the PWM pulse VPWM2 at a minimum pulse width before startup, to limit a duty ratio below 100% in the startup period, and to prevent the semiconductor switches MH and ML from simultaneously turning ON.

The DC to DC converter having the construction described above is in a stand-by state before its startup, and the discharge switch SW of the soft start circuit is in an ON state.

When the discharge switch SW is turned OFF to start the soft start operation at the time t1 indicated in FIG. 11, the capacitor CS is charged with a constant current from the constant current circuit IS and the terminal voltage VCS of the capacitor CS gradually increases. With gradual increase of the terminal voltage VCS, which is a target voltage, the error voltage VE delivered from the error amplifier EA likewise increases, which makes the duty ratio of the PWM pulse VPWM1 from the PWM comparator COMP increase slowly. Because the duty ratio of PWM pulse VPWM2 delivered by the logic circuit LC also increases gradually similarly to the PWM pulse VPWM1, the output voltage VOUT rises slowly. When the terminal voltage VCS of the capacitor CS becomes equal to the reference voltage VR at the time t2, the soft start operation is completed and the output voltage VOUT stops increasing and becomes a constant voltage. After completion of the startup, the output voltage VOUT is monitored by the resistors R1 and R2 and fed back as a feedback signal VFB to the error amplifier EA. The error amplifier operates with a target voltage of the reference voltage VR. When the output voltage VOUT changes, the error amplifier EA delivers an error voltage VE to compensate for the change, thereby controlling the output voltage VOUT at a constant voltage.

Before the startup at the time t1, the error amplifier EA in an actual operation thereof may deliver an error voltage VE not exactly equal to zero volts. As a consequence, the PWM comparator COMP delivers a PWM pulse VPWM1 with a duty ratio not larger than the minimum duty ratio at a frequency of the triangular signals VOSC. The PWM pulse VPWM1 is transformed to a PWM pulse VPWM2 with the minimum duty ratio by the logic circuit LC. This PWM pulse VPWM2 ON/OFF-controls the semiconductor switches MH and ML. Therefore, the DC to DC converter delivers a certain magnitude of output voltage VOUT=VO1 still before the startup at the time t1 as shown in FIG. 11. Although FIG. 11 is schematically depicted, in the constraint of representation with a drawing, with an exaggerated period of triangular waveform, an actual period corresponding to a single triangular waveform in the figure includes several tens to several thousands of triangular waves or pulses in actuality.

The operation delivering the voltage VO1 before startup can be advantageous in some cases. For example, in a case when a current signal detecting function, such as overcurrent protection, is provided, or in a case when a current mode control is conducted, the operation is beneficial. In these cases, pulses with at least a minimum pulse width may be continuously delivered in order for a current detecting function not to erroneously respond to a current surge in the switching time.

Even in the case the output of the voltage VO1 before startup is not advantageous, which means zero percent of the duty ratio of PWM pulses is desired, the circuit of FIG. 10 may unintentionally give a VPWM1 when an offset is generated at the input stage of the PWM comparator COMP due to variation in product characteristics. As a result, a non-zero volt voltage VO1 may be generated in the output voltage VOUT.

In the type of DC to DC converter having a construction continuously giving PWM pulses VPWM2 with a minimum duty ratio before startup, an unnecessary voltage VO1 is continuously applied to a load circuit connected to the output terminal before operation.

Accordingly, Patent Document 1 (identified further on) discloses a circuit construction to avoid generation of output voltage VOUT=VO1 before startup by inhibiting output of PWM pulse VPWM2 before startup. The following describes a construction of the startup circuit of the DC to DC converter disclosed in Patent Document 1.

FIG. 12 is a block diagram showing a construction of a startup circuit of the DC to DC converter disclosed in Patent Document 1. FIG. 13 shows waveforms of voltages in operation of the DC to DC converter using the startup circuit of FIG. 12. FIG. 12 omits the drivers DH and DL and the components in their downstream in FIG. 10. The components in FIG. 12 that are the same or equivalent to the components depicted in FIG. 10 are given the same symbol and detailed description thereon is omitted.

The startup circuit of FIG. 12 is provided with a logical product circuit AND at the output side of the logic circuit LC and a detecting circuit DET to detect the terminal voltage VCS of the capacitor CS. The logical product circuit AND is connected to the output terminal of the logic circuit LC at the first input terminal of the circuit AND, and is connected to the output terminal of the detecting circuit DET at the second input terminal of the circuit AND. The output terminal of the logical product circuit AND is connected to the input terminals of the drivers DH and DL and delivers a PWM pulse VPWM3, which is a logical product of the output of the logic circuit LC and the output of the detecting circuit DET. The logical product circuit AND is actually composed of two circuits, each delivering separately a pulse for the driver DH and a pulse for the driver DL.

The detecting circuit DET has a predetermined threshold value for detection, delivering a detection signal VD at a low level before the predetermined threshold value is reached by the terminal voltage VCS of the capacitor CS, and delivering a detection signal VD at a high level after the predetermined threshold value is exceeded by the terminal voltage VCS.

Before the startup time t1, which is indicated in FIG. 13, of the startup circuit, the detecting circuit DET delivers a detection signal VD at a low level. Consequently, the logical product circuit AND blocks the PWM pulse VPWM2 from the logic circuit LC. Just from the startup time t1 by opening the discharge switch SW to the time t3 at which the terminal voltage VCS of the capacitor CS reaches a predetermined threshold value, the detecting circuit DET continuously delivers a detection signal VD at a low level. Consequently, up to the time t3, the logical product circuit AND interrupt the PWM pulse VPWM3 that is to be given to the drivers DH and DL, and thus, the semiconductor switches MH and ML do not perform switching operation maintaining the output voltage VOUT at zero volts.

When the detecting circuit DET detects the terminal voltage VCS exceeding the predetermined threshold value, blockage by the logical product circuit AND is released, and the PWM pulse VPWM3 is permitted to be delivered to the drivers DH and DL. After that, switching operation is conducted according to the terminal voltage VCS of the capacitor CS as a target voltage for the output voltage VOUT. The output voltage VOUT increases gradually up to the time t2 at which the terminal voltage VCS reaches the reference voltage VR. After that, the output voltage VOUT is controlled at a constant voltage.

As described above, in this startup circuit, the output voltage VOUT is forcedly made to be zero volts, avoiding generation of the voltage VO1 despite output of the PWM pulse VPWM1 from the PWM comparator COMP before startup.

Patent Document 1

Japanese Unexamined Patent Application Publication No. 2004-215356

The startup circuit of FIG. 12 blocks the signal for driving the semiconductor switches MH and ML before the terminal voltage VCS of the capacitor CS reaches a predetermined threshold value. However, a malfunctioning can occur when the blocking is released. In the period after startup of the startup circuit, in which switching operation of the semiconductor switches MH and ML is interrupted until the terminal voltage VCS reaches the threshold value, the error amplifier EA is trying to control a startup procedure. The error amplifier EA tries to control the output voltage VOUT with a target voltage of the rising terminal voltage VCS. However, because the output voltage VOUT does not increase, the error voltage VE may excessively rise to saturation as shown in FIG. 13. In this situation, when the blocking of the signal for driving the semiconductor switches MH and ML is released suddenly, the error amplifier EA cannot perform the scheduled control with a target voltage of the gradually increasing ramp voltage of terminal voltage of VCS, and control of the output voltage VOUT becomes impossible at the moment just after the release of blocking. In the case where it takes a long time for abnormally risen error voltage VOUT to restore an original low value, in particular, significant temporal disturbance may occur.

Although FIG. 13 is schematically depicted, in the constraint of representation with a drawing, with an exaggerated period of triangular waveform, an actual period corresponding to a single triangular waveform in the figure includes multiple of triangular waves. In addition, it is depicted as though the error voltage VE abruptly jumps up at the time t1, and abruptly falls down at the time t3. Actually, the error voltage VE varies gradually during the period of plural triangular waveforms. Likewise, the output voltage VOUT is depicted as though it changes stepwise at the time t3.

Actually, it varies gradually during the period of plural triangular waveforms.

SUMMARY OF THE INVENTION

The present invention has been made to solve the problems described above and an object of the present invention is to provide a startup circuit that raises output voltage slowly in the startup period of a power supply, avoiding fast variation of the output voltage, and to a power supply circuit including such a startup circuit.

To attain the above object, a startup circuit of the invention comprises:

an error amplifier that amplifies an error between an output voltage and a target voltage for the output voltage; a PWM comparator that compares an output signal of the error amplifier with a triangular signal and generates a PWM signal; a soft start circuit that charges a capacitor for soft start by a current source and delivers a terminal voltage with a shape of a slope developing across the capacitor as a target voltage in a startup period to the error amplifier; a detecting circuit that delivers a first detection signal until the terminal voltage reaches a predetermined value and delivers a second detection signal after the terminal voltage exceeds the predetermined value; and a logical product circuit that blocks output of the PWM signal receiving the first detection signal and allows output of the PWM signal receiving the second detection signal; wherein the error amplifier disables an error amplification function receiving the first detection signal and enables the error amplification function receiving the second detection signal.

The startup circuit stated above blocks delivering the PWM signal and at the same time disables the function of the error amplifier until the terminal voltage of the capacitor for soft starting reaches a predetermined value in the startup period. Thus, when the terminal voltage reaches the predetermined value and delivering of the PWM signal begins, the error amplifier starts error amplification between a target voltage of the terminal voltage and a feedback signal.

A startup circuit of another aspect of the present invention further comprises a level shift circuit that is disposed between the soft start circuit and the error amplifier, and delivers a voltage level-shifted toward a lower voltage from the terminal voltage as a target voltage in a startup period.

The present invention also provides a power supply circuit having such a startup circuit.

In the startup circuit and the power supply circuit, the error amplifier receives a target voltage of a voltage that is level-shifted from the terminal voltage of the capacitor for soft starting by the level shift circuit in the startup period. After that, the error amplifier starts error amplification according to the target voltage and the feedback signal.

The startup circuit having the construction as stated above having functions of disable or enable the error amplification function blocks delivering the PWM signal and disable the error amplification function in the startup period, and the error amplification function is enabled at the moment of starting delivery of the PWM signal. Therefore, the output voltage does not change abruptly and rises slowly.

The startup circuit having the construction stated above having a level shift circuit delivers the terminal voltage to the error amplifier after reducing the level by a predetermined value by the level shift circuit. Thus, the error amplifier avoids overvoltage in the startup period. Therefore the output voltage does not change abruptly and rises slowly.

DETAILED DESCRIPTION OF THE INVENTION

Figure 10:
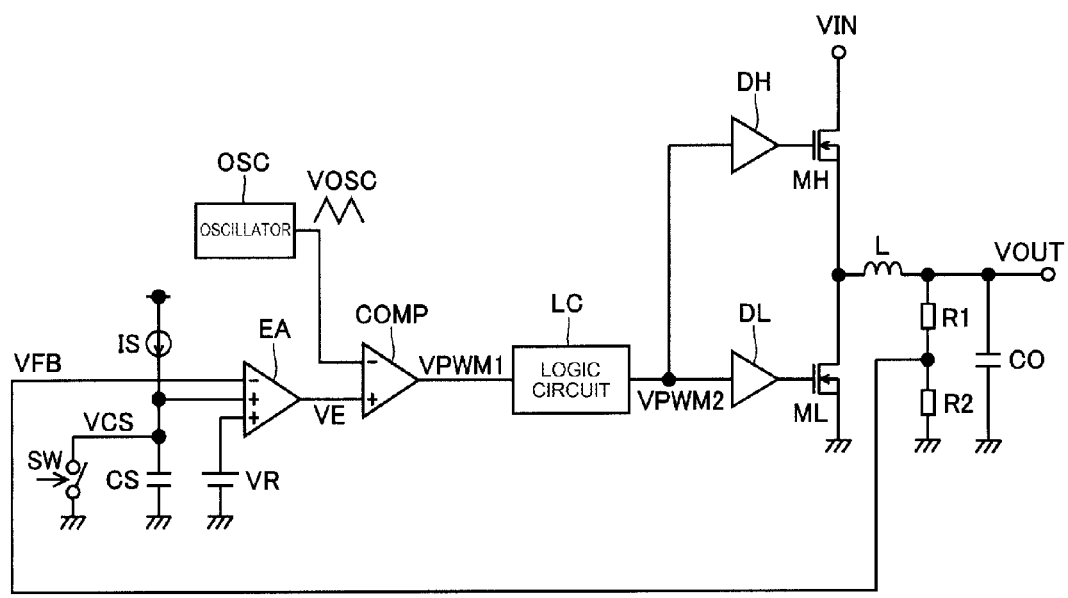
FIG. 10 is a block diagram of an example of conventional DC to DC converter having a soft starting function.
Figure 11:
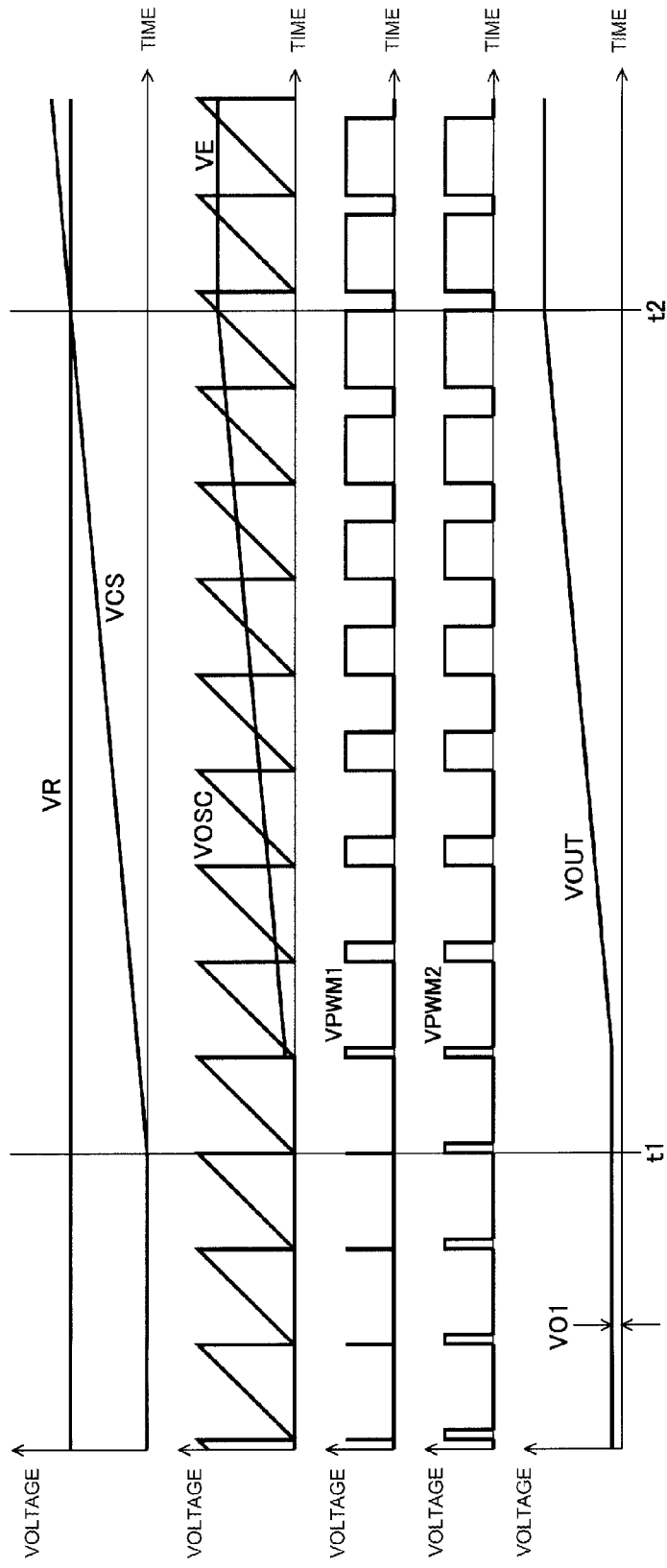
FIG. 11 shows waveforms of voltages in operation of the conventional DC to DC converter of FIG. 10.

Some preferred aspects of embodiments of the present invention will be described for the examples applied to DC to DC converters in detail in the following with reference to the accompanying drawings. It should be noted that the drivers DH and DL and the components in the downstream of the construction of FIG. 10 are omitted in the following description and the signals given to the drivers DH and DL are represented by PWM pulse VPWM3. The aspects of embodiments including variations can be applied in combination of plural constructions as long as no contradiction is included.

Figure 1:
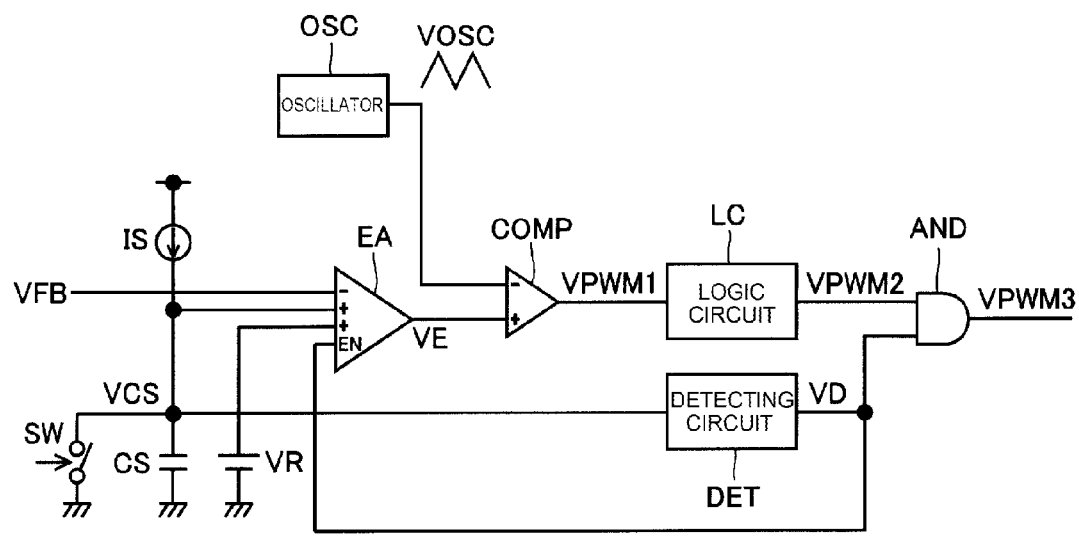
FIG. 1 is a block diagram of an example of startup circuit of a DC to DC converter according to a first aspect of embodiment of the present invention.
Figure 12:
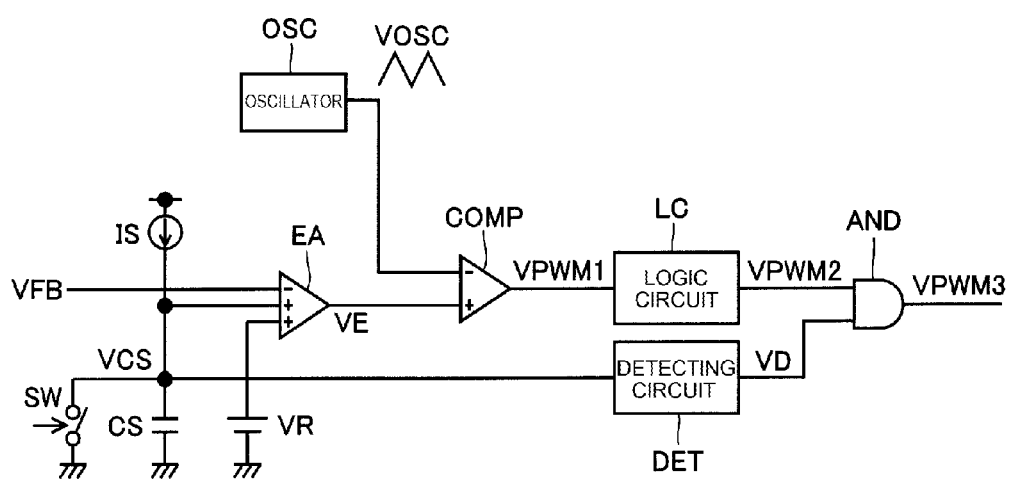
FIG. 12 shows an example of construction of a startup circuit of another conventional DC to DC converter.
Figure 13:
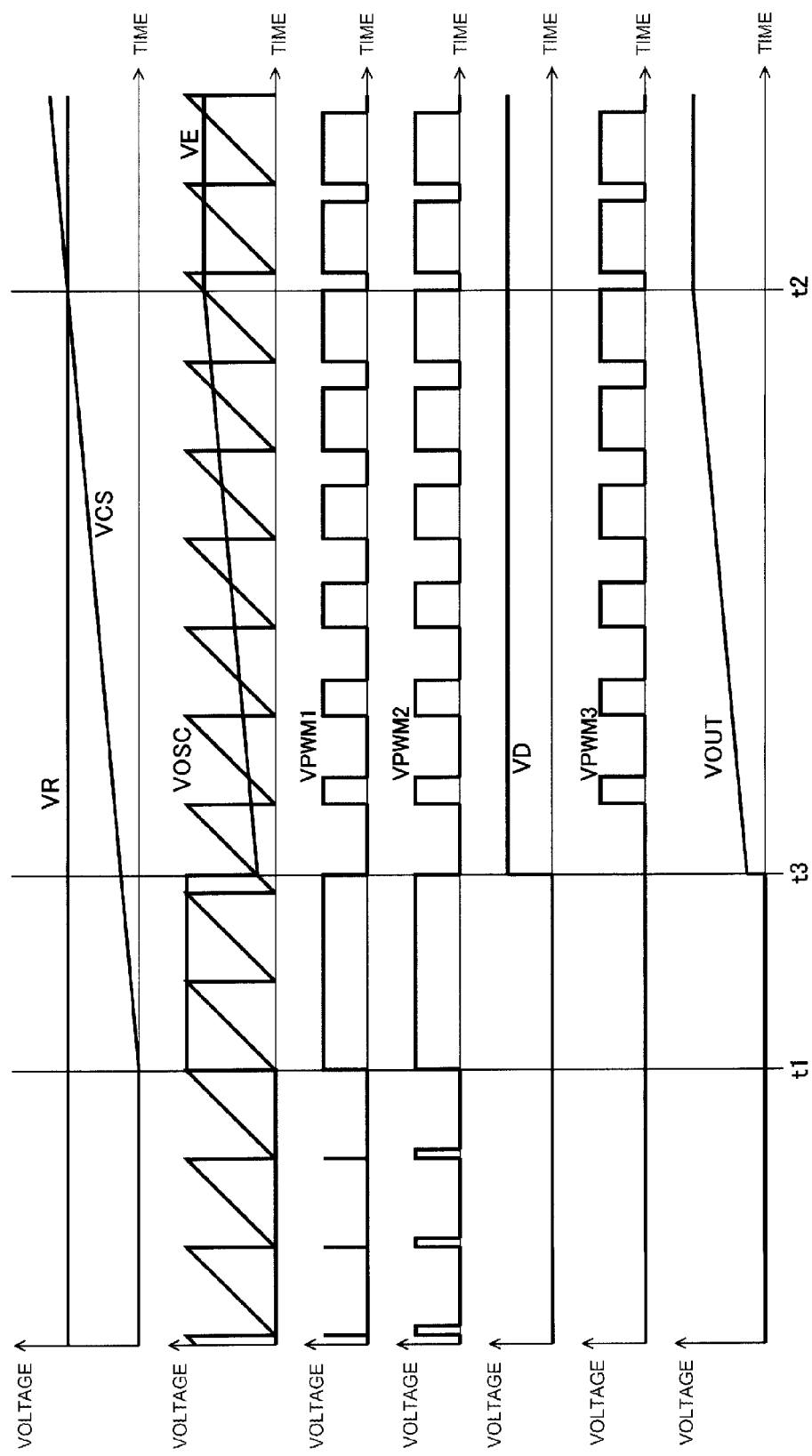
FIG. 13 shows waveforms of voltages in operation of the conventional DC to DC converter using the startup circuit of FIG. 12.

FIG. 1 is a block diagram showing a construction of a startup circuit of a DC to DC converter according to a first aspect of embodiment of the present invention. The components in FIG. 1 same as or equivalent to the components shown in FIG. 12 are given the same symbols and detailed description thereon is omitted.

This startup circuit of a DC to DC converter has an error amplifier EA provided with an enable terminal EN that controls effectiveness of the error amplifier EA. The enable terminal EN is connected to an output terminal of a detecting circuit DET.

In this startup circuit, the detecting circuit DET delivers a detection signal VD at a low level before startup in which a discharge switch SW is in a closed state. The error amplifier EA, which receives the detection signal VD at the enable terminal EN, is made to have its error amplifying function disabled. The error amplifier EA in a disabled state delivers an error voltage VE of zero volts.

After startup at which the discharge switch SW is opened, the detection circuit DET delivers a detection signal VD at a low level until the detection circuit DET detects that the terminal voltage VCS of the capacitor CS has reached a predetermined threshold value. Therefore, the error amplifier EA remains in a disabled state.

When the terminal voltage VCS of the capacitor CS exceeds the predetermined threshold value, the detection circuit DET delivers a detection signal VD at a high level to make the function of the error amplifier EA enabled. The error amplifier EA does not work until receiving a detection signal VD at a high level. At the moment of receipt of the high level detection signal VD, an error voltage VE start to rise corresponding to the difference between the terminal voltage VCS of the capacitor CS and a feedback signal VFB. Therefore, this startup circuit does not cause steep variation of output voltage VOUT in the startup period of the power supply and slowly raises the output voltage VOUT.

The PWM pulse VPWM2 given from the logic circuit LC is sometimes delivered separately with pulses for the driver DH and the pulses for the driver DL in actual operation of the startup circuit. In that case, there are two logical product circuits AND. Alternatively, the signals for the driver DH and the signals for the driver DL are separately generated in a stage next to the logical product circuit AND.

Figure 2:
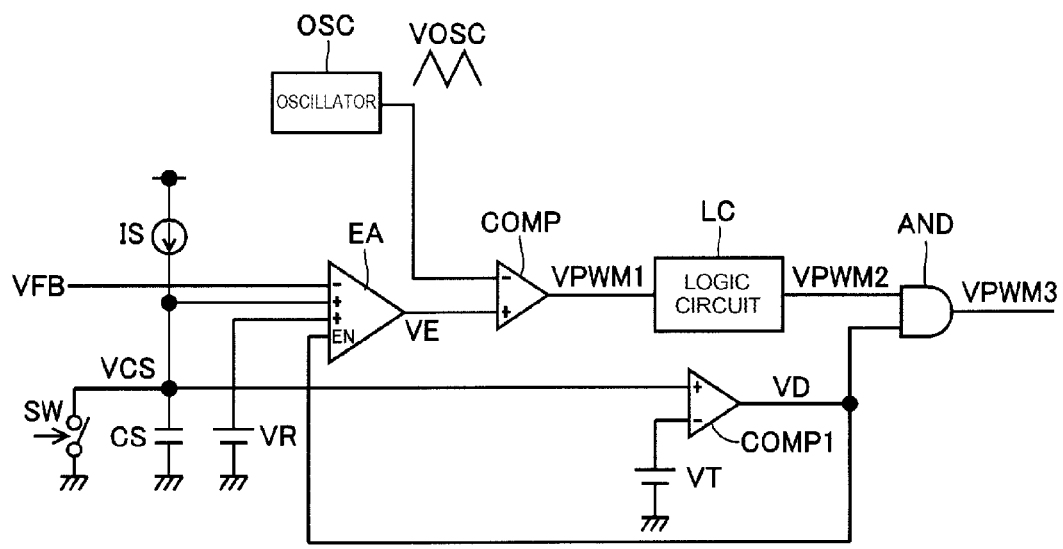
FIG. 2 is a block diagram of a variation of startup circuit of a DC to DC converter according to the first aspect of embodiment of the present invention.
Figure 3:
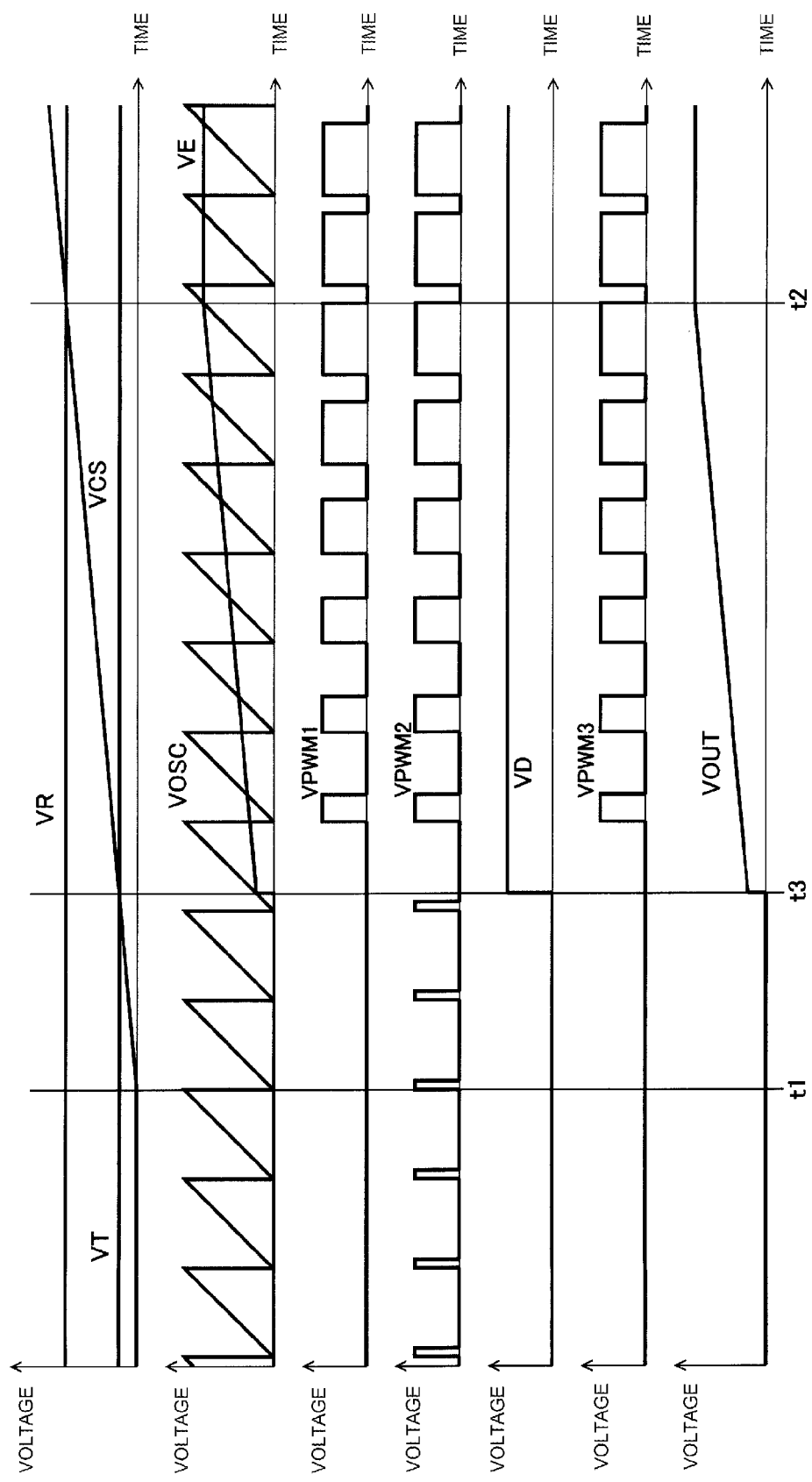
FIG. 3 shows waveforms of voltages in operation of a DC to DC converter according to the first aspect of embodiment of the present invention.

FIG. 2 is a block diagram of a variation of a startup circuit of the DC to DC converter according to the first aspect of embodiment of the invention. FIG. 3 shows waveforms of voltages in operation of the DC to DC converter according to the first aspect of embodiment of the invention. The components in FIG. 2 same as or equivalent to the components shown in FIG. 1 are given the same symbols and detailed description thereon is omitted.

In this variation of the startup circuit of the DC to DC converter according to the first aspect of embodiment, the detecting circuit DET in FIG. 1 is composed of a comparator COMP1 in FIG. 2. The COMP1 receives the terminal voltage VCS of the capacitor CS at a non-inverting terminal thereof, and receives a reference voltage VT at an inverting terminal thereof. An output terminal of the comparator COMP1 is connected to a second input terminal of a logical product circuit AND and to an enable terminal EN of the error amplifier EA. The reference voltage VT corresponds to the predetermined threshold value of the detecting circuit DET of FIG. 1.

Consequently, the comparator COMP1 delivers a detection signal VD at a low level until the terminal voltage VCS of the capacitor CS reaches the reference voltage VT, and delivers a detection signal VD at a high level after the terminal voltage VCS of the capacitor CS exceeds the reference voltage VT. During the time comparator COMP1 is delivering a detection signal VD at a low level, a PWM pulse VPWM2 is blocked and the error amplifier EA is made disabled. When the comparator COMP1 delivers a detection signal VD at a high level, the blockage of the PWM pulse VPWM2 is released and the error amplifier EA is made enabled.

Before the time t1, which is indicated in FIG. 3, when the startup circuit starts up, the comparator COMP1 delivers a detection signal VD at a low level, and the logical product circuit AND blocks the PWM pulse VPWM2 delivered from the logic circuit LC. From startup, at which the discharge switch SW is opened, to the time t3 at which the terminal voltage VCS of the capacitor CS reaches the reference voltage VT, the comparator COMP1 continues to deliver the detection signal VD at a low level. Thus, until the time t3, the logical product circuit AND interrupt a PWM pulse VPWM3 that is to be given to the drivers DH and DL to hinder switching operation of the semiconductor switches MH and ML. Thus, the output voltage VOUT is zero volts.

When the comparator COMP1 detects the terminal voltage VCS has exceeded the reference voltage VT, the blockage by the logical product circuit AND is released, and the PWM pulse VPWM3 is starts to be delivered to the drivers DH and DL. After that, switching operation is conducted with a target voltage for the output voltage VOUT of the terminal voltage VCS of the capacitor CS. The output voltage VOUT gradually increases until the time t2 at which the terminal voltage VCS reaches the reference voltage VR. After that the output voltage VOUT is controlled at a constant voltage.

In this startup circuit, in the period before startup and after startup until the output of the comparator COMP1 reverses, the error amplifier EA is in a disabled state and the error voltage VE is zero volts. When the output of the comparator COMP1 reverses to enable the error amplifier EA, the error voltage VE delivered from the error amplifier EA rises, as shown in FIG. 3, from zero volts to a value corresponding to the difference between the terminal voltage VCS at the moment and the output voltage VOUT. Although FIG. 3 is schematically depicted, in the constraint of representation with a drawing, with an exaggerated period of triangular waveform, an actual period corresponding to a single triangular waveform in the figure includes a multiple of triangular waves. In addition, the error voltage VE and the output voltage VOUT are depicted as though they change stepwise at the time t3. Actually, they vary gradually during the period of plural triangular waveforms. Then, the error voltage VE gradually increases corresponding to the difference between the terminal voltage VCS and the output voltage VOUT, lasting until the time t2 at which the terminal voltage VCS reaches the reference voltage VR. Because the error voltage VE does not abnormally rise immediately after the error amplifier EA becomes enabled, the output voltage VOUT of the DC to DC converter does not change abruptly but rises gradually.

Figure 4:
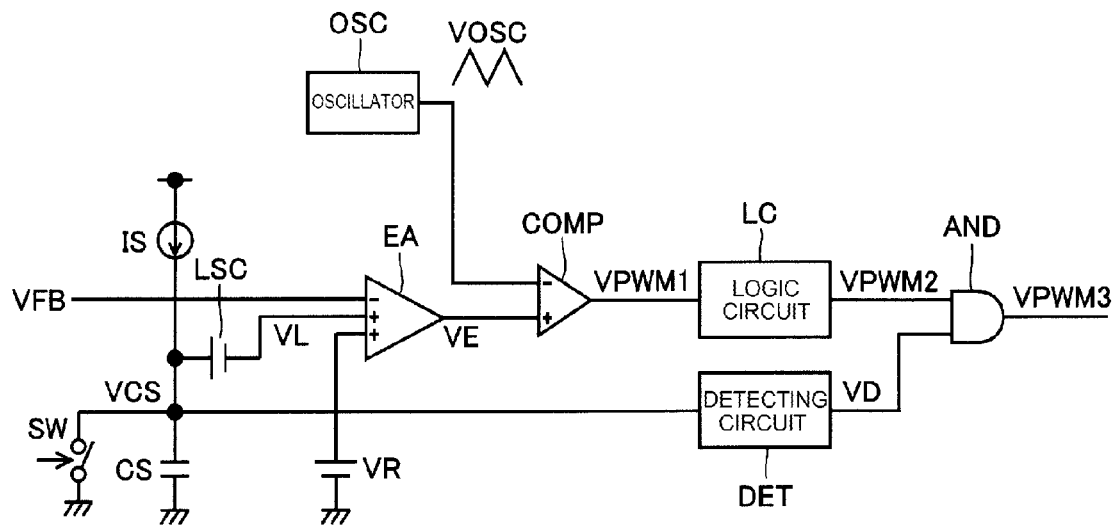
FIG. 4 is a block diagram of an example of startup circuit of a DC to DC converter according to a second aspect of embodiment of the present invention.

FIG. 4 is a block diagram showing a construction of a startup circuit of a DC to DC converter according to a second aspect of embodiment of the present invention. The components in FIG. 4 same as or equivalent to the components shown in FIG. 1 are given the same symbols and detailed description thereon is omitted.

The startup circuit of a DC to DC converter according to the second aspect of embodiment is provided with a level shift circuit LSC between a connection point of the constant current circuit IS and the capacitor CS, and a non-inverting terminal of the error amplifier EA.

Because this level shift circuit LSC lowers the level of the terminal voltage VCS by a predetermined amount before delivering to the error amplifier EA, the error amplifier EA avoids over-voltage of the error voltage VE during the startup period.

The level shift circuit LSC preferably gives a level shift value approximately equal to the threshold value of the detection circuit DET. By this means, when the detecting circuit DET detects the terminal voltage VCS exceeding the predetermined threshold value, the error amplifier EA can use a level shifted voltage VL that rises up from a lower voltage than the one in the first aspect of embodiment for a target voltage. Consequently, the duty ratio of the PWM pulse VPWM3 in the startup period can be made smaller than the one in the case of first aspect of embodiment, and accordingly the output voltage VOUT rises more slowly.

Figure 5:
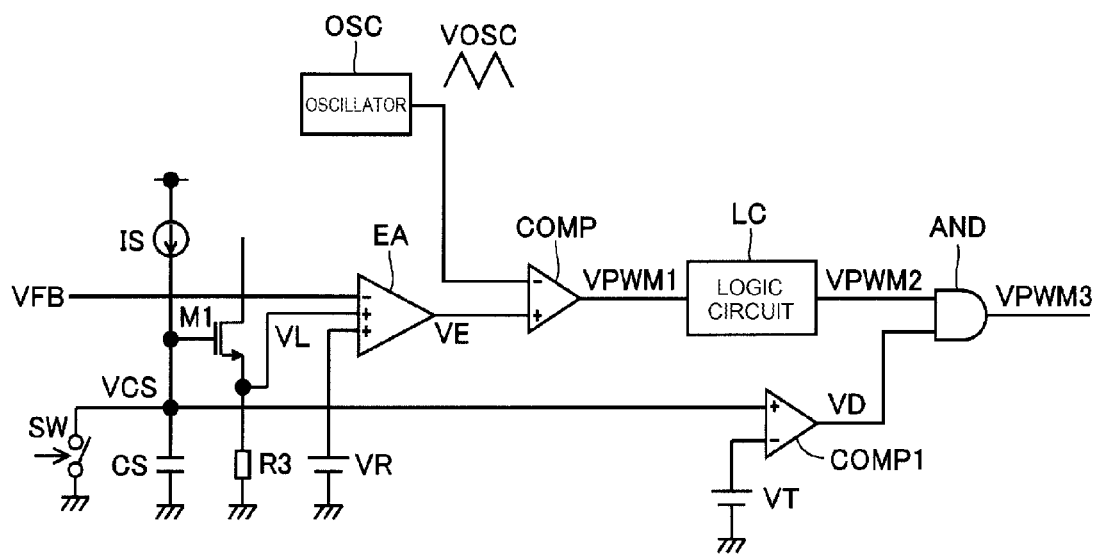
FIG. 5 is a block diagram of a first variation of startup circuit of a DC to DC converter according to the second aspect of embodiment of the present invention.
Figure 6:
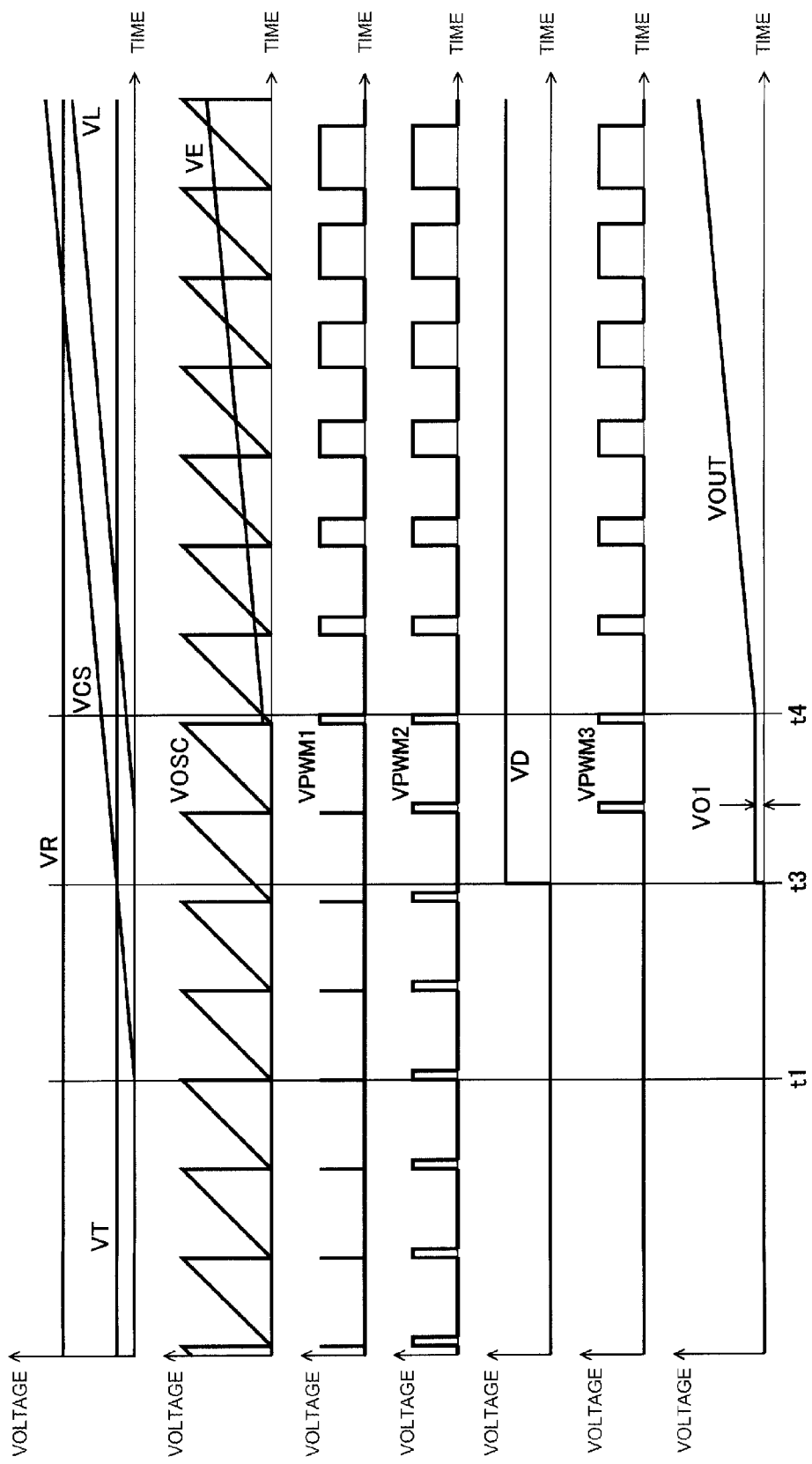
FIG. 6 shows waveforms of voltages in operation of a DC to DC converter according to the second aspect of embodiment of the present invention.

FIG. 5 is a block diagram showing a first variation of a startup circuit of the DC to DC converter according to the second aspect of embodiment. FIG. 6 shows waveforms of voltages in operation of the DC to DC converter according to the second aspect of embodiment. The components in FIG. 5 same as or equivalent to the components shown in FIG. 2 and FIG. 4 are given the same symbols and detailed description thereon is omitted.

In the first variation of the second aspect of embodiment, the detecting circuit DET in FIG. 4 is composed of a comparator COMP1 in FIG. 5, and the level shift circuit LSC is composed of a source follower circuit of an N channel type metal oxide semiconductor field effect transistor (MOSFET) M1.

The gate terminal of the MOSFET M1 is connected to the connection point between the constant current circuit IS and the capacitor CS, and the source terminal is connected through a resistor R3 to the ground. The connection point between the source terminal and the resistor R3 is connected to a non-inverting terminal of the error amplifier EA. Consequently, when the terminal voltage VCS exceeds a threshold value, the MOSFET M1 delivers a level-shifted voltage VL lower than the terminal voltage VCS by the gate-source voltage, which is approximately equal to the threshold value of the MOSFET M1.

From startup of the startup circuit to the time t3 at which the terminal voltage VCS reaches the reference voltage VT, the comparator COMP1 blocks the PWM pulse VPWM2 at the logical product circuit AND. Thus, the output voltage VOUT is zero volts. Then the terminal voltage VCS exceeds the reference voltage VT at the time t3, indicated in FIG. 6, and the PWM pulse VPWM3 is delivered to start switching operation of the semiconductor switches MH and ML. In this time, if the terminal voltage VCS has not reached the threshold value of the MOSFET M1, the error amplifier EA delivers an error voltage VE that is approximately zero volts, or occasionally a nonzero voltage. Consequently, the PWM comparator COMP delivers a PWM pulse VPWM1 with a small duty ratio. The semiconductor switches MH and ML conduct switching operation according to this PWM pulse VPWM1, and the voltage VO1 is delivered for an output voltage VOUT.

When the terminal voltage VCS exceeds the threshold value of the MOSFET M1 at the time t4, which is indicated in FIG. 6, the error voltage VE from the error amplifier EA gradually increases, and simultaneously the output voltage VOUT also rises. Although not depicted in FIG. 6, this increase in the output voltage VOUT continues until the level-shifted voltage VL reaches the reference voltage VR, at which the soft starting process finishes. Although FIG. 6 is schematically depicted, in the constraint of representation with a drawing, with an exaggerated period of triangular waveform, an actual period corresponding to a single triangular waveform in the figure includes a multiple of triangular waves. In addition, the output voltage VOUT is depicted as though it changes stepwise at the time t3, and the error voltage VE is depicted as though it changes stepwise at about the time t4. Actually, they vary gradually over the period of plural triangular waveforms.

Figure 7:
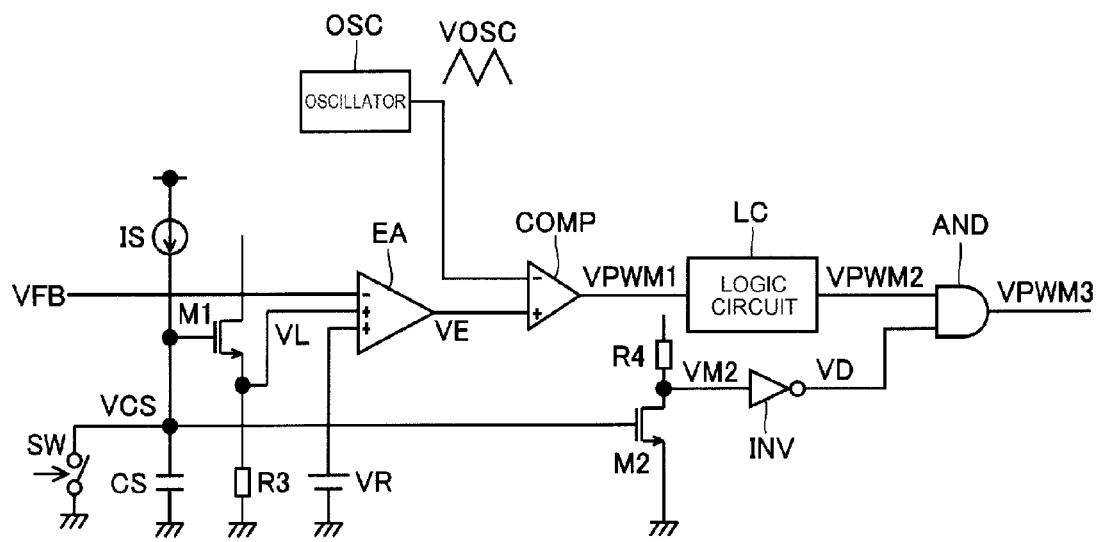
FIG. 7 is a block diagram of a second variation of startup circuit of a DC to DC converter according to the second aspect of embodiment of the present invention.

FIG. 7 is a block diagram showing a second variation of a startup circuit of the DC to DC converter according to the second aspect of embodiment. The components in FIG. 7 same as or equivalent to the components shown in FIG. 5 are given the same symbols and detailed description thereon is omitted.

In this second variation of the second aspect of embodiment, the comparator COMP1 in FIG. 5 is composed of a common source circuit of an N channel MOSFET M2 in FIG. 7. The gate terminal of the MOSFET M2 is connected to the connection point between the constant current circuit IS and the capacitor CS, the source terminal is connected to the ground potential, and the drain terminal is connected through a pull-up resistor R4 to a high level potential. The connection point between the drain terminal of the MOSFET M2 and the resistor R4 is connected to the input terminal of an inverter INV. The output of the inverter INV is connected to a second input terminal of the logical product circuit AND. The MOSFET M2 is in an OFF state until the terminal voltage VCS reaches the threshold value of the MOSFET M2, and delivers an output voltage VM2 at a high level. The inverter INV inverts this voltage and delivers a detection signal VD at a low level. When the terminal voltage VCS exceeds the threshold value of the MOSFET M2, the MOSFET M2 turns ON, delivering an output voltage VM2 at a low level. The inverter INV inverts this voltage and delivers a detection signal VD at a high level.

This startup circuit uses the same type of N channel MOSFETs M1 and M2 for the level shift circuit LSC and the detecting circuit DET for detecting the terminal voltage VCS. This allows the setting of an approximately same moment of time between the timing of starting the rise of the level shift voltage VL and the timing of delivering the detection signal VD at a high level. Thus, a smooth soft starting is achieved. Referring the voltage waveforms in FIG. 6, the time t3 can be made near the timing of starting the rise of the level shift voltage VL, and therefore, the period of delivering the voltage VO1 can be shortened.

Figure 8:
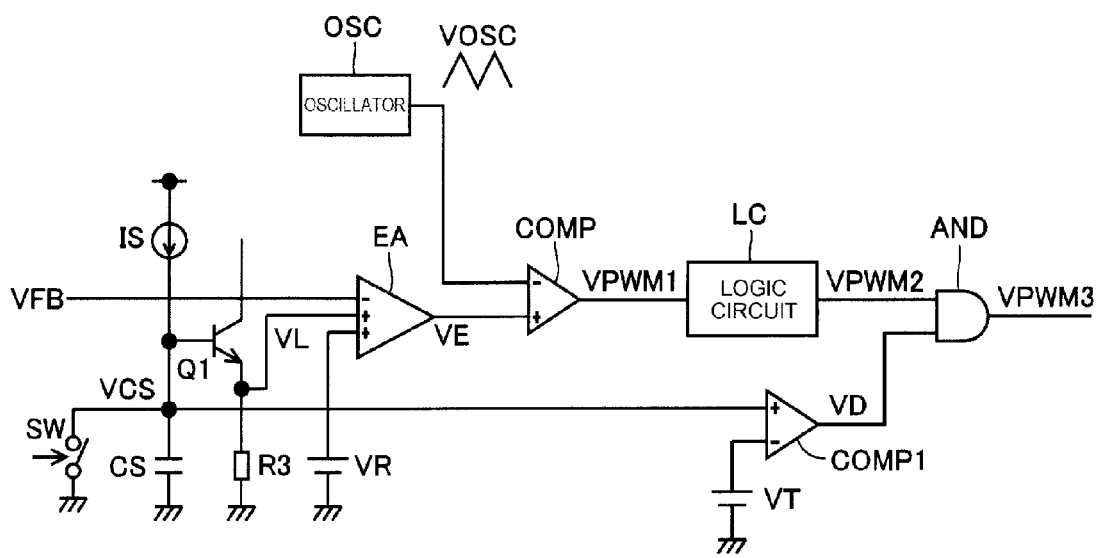
FIG. 8 is a block diagram of a third variation of startup circuit of a DC to DC converter according to the second aspect of embodiment of the present invention.

FIG. 8 is a block diagram showing a third variation of a startup circuit of the DC to DC converter according to the second aspect of embodiment. The components in FIG. 8 same as or equivalent to the components shown in FIG. 5 are given the same symbols and detailed description thereon is omitted.

In this third variation, a level shift circuit LSC is constructed by an emitter follower circuit of a bipolar transistor Q1, whereas the level shift circuit LSC is composed of an N channel MOSFET M1 in the first variation of FIG. 5. The bipolar transistor used is an NPN type transistor. The bipolar transistor Q1 delivers, from the emitter terminal thereof, a voltage level-shifted from the terminal voltage VCS applied to the base terminal by the base-emitter forward voltage. The operation of the startup circuit of the third variation is virtually the same as that of the startup circuit of the first variation shown in FIG. 5 of the second aspect of embodiment.

Figure 9:
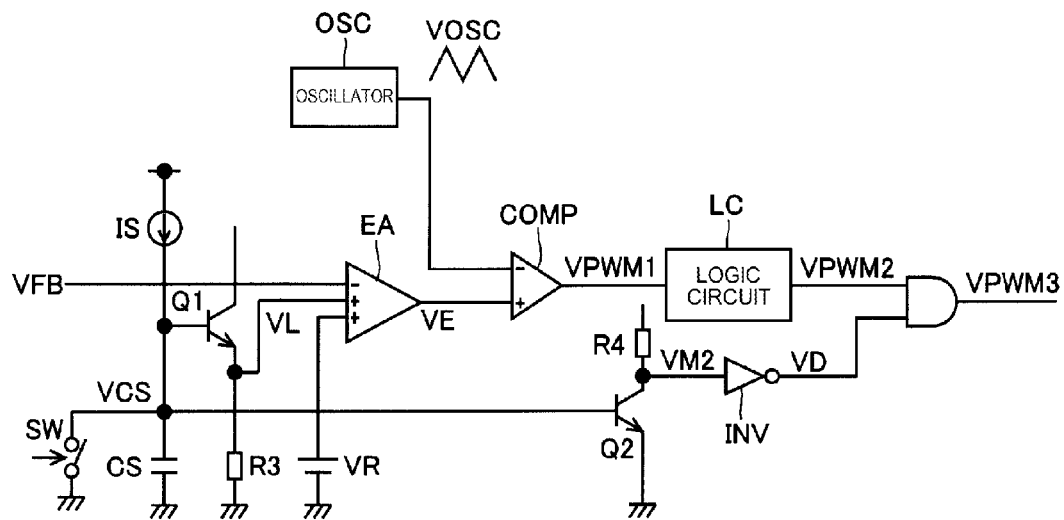
FIG. 9 is a block diagram of a fourth variation of startup circuit of a DC to DC converter according to the second aspect of embodiment of the present invention.

FIG. 9 is a block diagram showing a fourth variation of a startup circuit of the DC to DC converter according to the second aspect of embodiment. The components in FIG. 9 same as or equivalent to the components shown in FIG. 7 are given the same symbols and detailed description thereon is omitted.

In this fourth variation, the N channel MOSFETs M1 and M2 in the second variation of FIG. 7 are replaced by bipolar transistors Q1 and Q2, respectively. In this startup circuit, the level shift circuit LSC is composed of an emitter follower circuit of the NPN type bipolar transistor Q1, and the detection circuit DET is composed of a common emitter circuit of the NPN type bipolar transistor Q2. The operation of the startup circuit of the fourth variation is virtually the same as that of the startup circuit of the second variation shown in FIG. 7 of the second aspect of embodiment.

Although the invention is explained thus far in connection with voltage mode control, which controls by feeding back the output voltage VOUT to the error amplifier EA, the present invention can be applied alike to a DC to DC converter of current mode control, which has a control loop of detecting a current through the inductor L and feeding it back.

It will be apparent to one skilled in the art that the manner of making and using the claimed invention has been adequately disclosed in the above-written description of the exemplary embodiments taken together with the drawings. Furthermore, the foregoing description of the embodiments according to the invention is provided for illustration only, and not for limiting the invention as defined by the appended claims and their equivalents.

It will be understood that the above description of the exemplary embodiments of the invention are susceptible to various modifications, changes and adaptations, and the same are intended to be comprehended within the meaning and range of equivalents of the appended claims.

DESCRIPTION OF SYMBOLS

AND: logical product circuit
CO: smoothing capacitor
COMP: PWM comparator
COMP1: comparator
CS: capacitor
DET: detecting circuit
DH, DL: driver
EA: error amplifier
EN: enable terminal
INV: inverter
IS: constant current circuit
L: inductor
LC: logic circuit
LSC: level shift circuit
M1, M2: MOSFET
MH, ML: semiconductor switch
OSC: oscillator
Q1, Q2: bipolar transistor
R1, R2, R3, R4: resistor
SW: discharging switch

What is claimed is:

1. A startup circuit comprising:
an error amplifier that performs amplification of an error between an output voltage and a target voltage for the output voltage;
a PWM comparator that compares an output signal of the error amplifier with a triangular signal and generates a PWM signal;
a soft start circuit that charges a capacitor for soft start by a current source and delivers a terminal voltage with a shape of a slope developing across the capacitor as a target voltage in a startup period to the error amplifier;
a detecting circuit that delivers a first detection signal to the error amplifier until the terminal voltage reaches a predetermined value and delivers a second detection signal to the error amplifier after the terminal voltage exceeds the predetermined value; and
a logical product circuit that blocks output of the PWM signal in response to the first detection signal and allows output of the PWM signal in response to the second detection signal; wherein
the error amplifier disables the amplification of the error between the output voltage and the target voltage for the output voltage in response to the first detection signal and enables the amplification of the error between the output voltage and the target voltage for the output voltage in response to the second detection signal.

2. The startup circuit according to claim 1 wherein the detecting circuit is a comparator that compares the terminal voltage with a reference voltage having a predetermined value.

3. A power supply circuit comprising the startup circuit as defined by claim 1.

4. The start-up circuit of claim 2, wherein an output of the comparator of the detecting circuit is coupled to an enable input of the error amplifier and to an AND gate of the logical product circuit.

5. The start-up circuit of claim 2, wherein the first detection signal corresponds to a time period in which the terminal voltage increases but has not yet exceeded the reference voltage.

* * * * *